United States Patent
Zuk et al.

(10) Patent No.: US 9,391,954 B2
(45) Date of Patent: *Jul. 12, 2016

(54) SECURITY PROCESSING IN ACTIVE SECURITY DEVICES

(71) Applicant: Palo Alto Networks, Inc., Santa Clara (CA)

(72) Inventors: Nir Zuk, Menlo Park, CA (US); Wilson Xu, San Jose, CA (US); Yuming Mao, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/271,243

(22) Filed: May 6, 2014

(65) Prior Publication Data

US 2014/0331311 A1 Nov. 6, 2014

Related U.S. Application Data

(63) Continuation of application No. 12/363,102, filed on Jan. 30, 2009, now Pat. No. 8,769,664.

(51) Int. Cl.
*H04L 29/06* (2006.01)

(52) U.S. Cl.
CPC ............ *H04L 63/02* (2013.01); *H04L 63/0236* (2013.01)

(58) Field of Classification Search
CPC .......................... H04L 63/02; H04L 63/0236
USPC ...................... 713/151, 153; 726/13
See application file for complete search history.

(56) References Cited

U.S. PATENT DOCUMENTS

| 7,415,723 | B2* | 8/2008 | Pandya | H04L 63/0218 370/389 |
| 7,441,267 | B1* | 10/2008 | Elliott | H04L 63/0428 713/153 |
| 7,778,176 | B2* | 8/2010 | Morford | H04L 41/08 370/231 |
| 7,808,897 | B1* | 10/2010 | Mehta et al. | 370/230 |
| 2006/0195896 | A1* | 8/2006 | Fulp | H04L 63/0263 726/11 |
| 2007/0297333 | A1* | 12/2007 | Zuk | H04L 63/1416 370/235 |

* cited by examiner

*Primary Examiner* — Saleh Najjar
*Assistant Examiner* — Oleg Korsak
(74) *Attorney, Agent, or Firm* — Van Pelt, Yi & James LLP

(57) ABSTRACT

Methods, systems, and apparatus, including computer program products, featuring receiving at a first security device a packet. The first security device determines that the packet is associated with a flow assigned to a distinct second security device. The first security device sends the packet to the second security device. After the second security device performs security processing using the packet, the first security device receives from the second security device a message regarding the packet. The first security device transmits the packet.

28 Claims, 5 Drawing Sheets

SECURITY PROCESSING IN ACTIVE SECURITY DEVICES

CROSS REFERENCE TO OTHER APPLICATIONS

This application is a continuation of co-pending U.S. patent application Ser. No. 12/363,102 entitled SECURITY PROCESSING IN ACTIVE SECURITY DEVICES filed Jan. 30, 2009 which is incorporated herein by reference for all purposes.

BACKGROUND

Security devices, for example, firewalls and intrusion detection systems (IDSs), are devices that are used to protect a computer network from unauthorized, malicious or disruptive users. A firewall can be used to secure a local area network from users outside the local area network. A firewall checks, routes, and can label messages sent to or from users outside the local area network.

Security devices can be stateful. For example, a stateful firewall can perform stateful packet inspection by keeping track of the state of network connections (e.g., Transmission Control Protocol (TCP) connections) passing through it. A stateful firewall keeps track of the state of traffic on the network by storing state information, e.g., Internet Protocol (IP) addresses and ports being used by the connection. A stateful firewall can reject packets that do not match a known connection state.

A network can include two or more security devices. In some networks with two security devices, one of the devices is active (i.e., actively processing packets) and the other is passive (i.e., not currently processing packets). The passive device becomes active when the active device fails. In other networks, both security devices are active to take advantage of features such as load balancing, high availability, and reliability assurance. In some networks that include two active, stateful firewalls, the firewalls synchronize with each other by sending each other state information.

SUMMARY

In general, one or more aspects of the subject matter described in this specification can be embodied in one or more methods that include receiving a packet at a first security device. The first security device determines that the packet is associated with a flow assigned to a distinct second security device. The first security device sends the packet to the second security device. After the second security device performs security processing using the packet, the first security device receives from the second security device a message regarding the packet. The first security device transmits the packet. Other embodiments of this aspect include corresponding systems, apparatus, and computer program products.

These and other embodiments can optionally include one or more of the following features. The message can comprise the first packet. The packet can be one of: an Internet Protocol (IP) packet, a Transmission Control Protocol (TCP) segment, and a User Datagram Protocol (UDP) datagram. The first and second security devices can each be a combination of one or more of: a firewall, a router, a switch, an Intrusion Detection System (IDS), and an Intrusion Protection System (IPS). Security processing can include one or more of: determining whether to drop or allow the packet, logging or storing the packet, setting an alarm, detecting viruses, detecting spyware, Uniform Resource Locator (URL) filtering, and Data Leakage Prevention (DLP).

Receiving a packet can include receiving a packet having been transmitted on a first route. Transmitting the packet can include transmitting the packet so that it continues along the first route The packet can be a response to an outbound packet associated with the flow, where the second security device performed security processing on the outbound packet and the second security device notified the first security device that the flow was assigned to the second security device. The outbound packet can be sent from a client to a server through the second security device; and the packet can be sent from the server to the first security device, where the packet is destined for the client.

Determining that the packet is associated with a flow assigned to a second security device can include: identifying state information associated with the packet and determining whether the state information associated with the packet is included in a flow table.

The first security device can receive an additional packet. The first security device determines that the additional packet is not associated with a flow. The first security device associates the additional packet with a new session. The first security device evaluates the new session to determine if received packets associated with the new session should be allowed. If received packets associated with the new session should be allowed, the first security device creates a new flow record in a flow table and notifies one or more other security devices that a new flow associated with the additional packet is assigned to the first security device.

The first security device can receive an additional packet. The first security device determines that the additional packet is associated with a second flow assigned to the first security device. The first security device determines whether the second flow has been classified. If the second flow has not been classified, the first security device attempts to classify the second flow. If attempting to classify the second flow is unsuccessful, the first security device stores a copy of the additional packet locally and performs security processing on the additional packet.

Particular embodiments of the invention can be implemented to realize one or more of the following advantages. First, full flow information does not have to be exchanged between security devices. Because exchanging flow information can generate large amounts of traffic, this significantly reduces bandwidth requirements and other hardware requirements. Second, packets can be routed without altering routing paths, for example, routing paths determined by Border Gateway Protocol (BGP) routers on the Internet. Because routing paths are generally determined to decrease latency and improve efficiency, routing without altering routing paths can decrease latency and improve efficiency. Third, network configuration is simplified. For example, peripheral network devices do not need to be reconfigured to handle altered routing paths.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
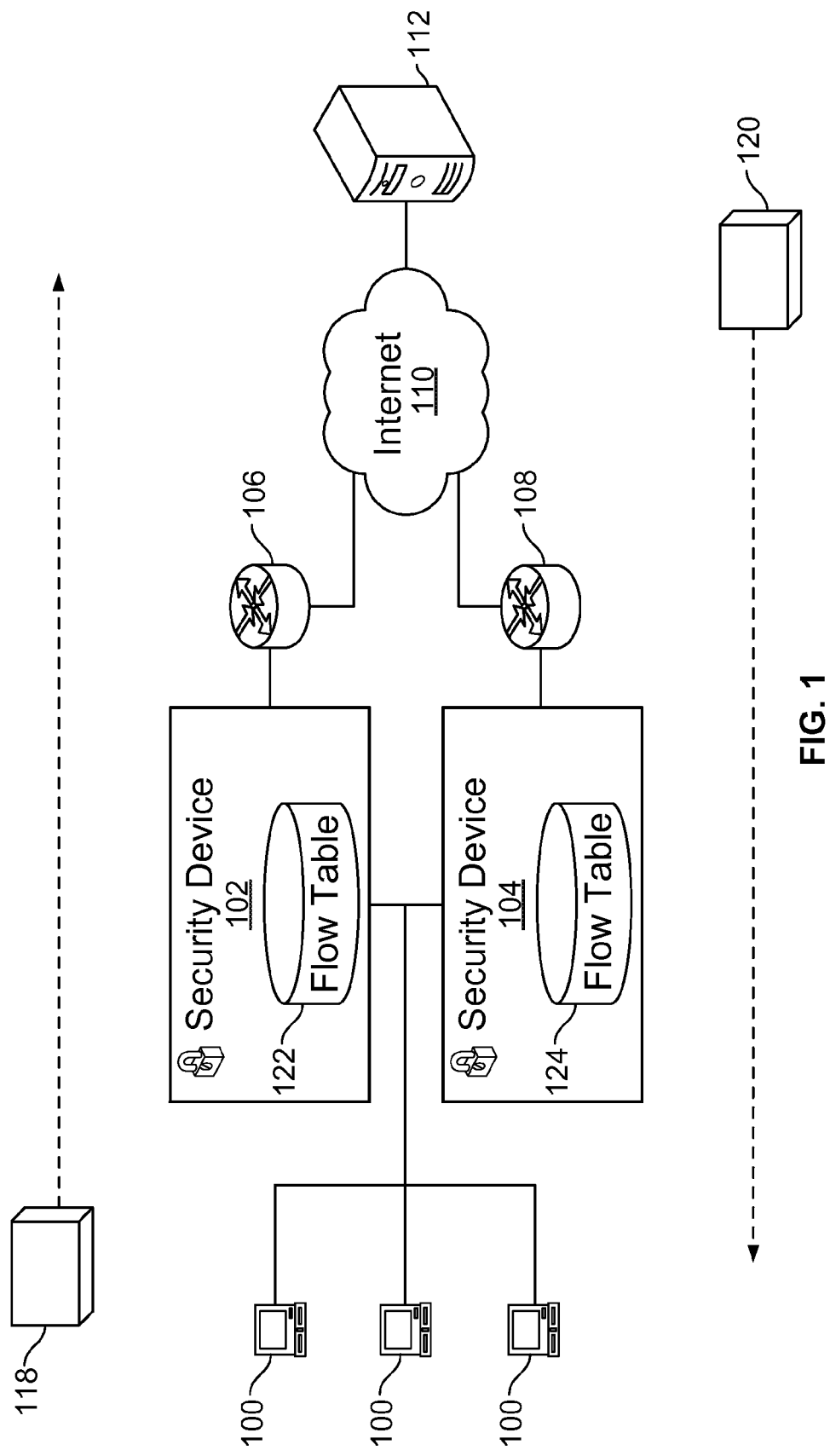
FIG. 1 shows an example system demonstrating packet forwarding between security devices.

FIG. 1 shows an example system demonstrating packet forwarding between security devices. In this example system, workstations 100 communicate with servers 112 by sending Transmission Control Protocol/Internet Protocol (TCP/IP) packets over the Internet 110. Typically the workstations 100 are running various applications that communicate with various servers 112. In this example system, an application on a workstation 100 is attempting to set up a TCP connection with server 112.

The workstation 100 begins the TCP three-way handshake by sending a SYN packet 118 destined for the server 112. The SYN packet 118 is transmitted to a first security device 102. The first security device 102 checks its flow table 122 and (because this is a new TCP connection) determines that the flow table 122 does not include a flow record for the SYN packet 118. The first security device 102 determines that this is an allowable flow and creates a flow record in the flow table 122. The flow record includes state information for the SYN packet 118. In various implementations, a flow record is a tuple comprising IP source and destination addresses, TCP source and destination ports, and protocol type. Other tuples are possible. The first security device 102 optionally attempts to classify the packet, e.g., determine which application sent the packet. The first security device 102 sends a message to a second security device 104 to indicate that this TCP connection is assigned to the first security device 102, and the second security device 104 adds a flow record to its flow table 124. The flow record indicates that the flow is assigned to the first security device 102. The first security device 102 performs security processing on the SYN packet 118, determines that the packet is allowable, and transmits it to router 106 which transmits it to server 112 over the Internet 110.

The server 112 generates a SYN-ACK packet 120 destined for the workstation 100 and sends it over the Internet 110. Due to asymmetric routing (e.g., as a result of ad hoc routing) on the Internet 110 in this example scenario, the SYN-ACK packet 120 is transmitted to a different router 108 and then to the second security device 104 instead of following the reverse path of the SYN packet 118. Although asymmetric routing will not always occur, for purposes of illustration such routing is shown in this example.

The second security device 104 checks its flow table 124 and determines that the flow associated with the SYN-ACK packet 120 is assigned to the first security device 102. The second security device 104 sends the SYN-ACK packet 120 to the first security device 102 for security processing. The first security device 102 performs security processing using the packet. In this example scenario, for purposes of illustration, the first security device 102 determines that the SYN-ACK packet 120 is allowable and then sends the SYN-ACK packet 120 (or a version thereof) back to the second security device 104. The second security device 104 transmits the SYN-ACK packet 120 to the workstation 100. Although not depicted, the workstation 100 can send an ACK packet to the server 112 in a similar manner, and then the workstation 100 and the server 112 can continue to communicate using the established TCP connection.

The network topology described in connection with FIG. 1 is merely an example. The network could be configured in various ways. For example, the network can include more than two security devices, the security devices 102 and 104 can be integrated with routers 106 and 108, the security devices 102 and 104 can be connected to each other with a dedicated high speed connection, and so on. In addition to the workstations, various devices can communicate using the security devices 102 and 104, for example, mobile devices, Voice over IP (VOIP) phones, and the like. Other network topologies are possible including those that include more than one network, wide area network(s), local area networks or combinations of both with or without distributed topologies (e.g., topologies other than client-server topologies). Networks can be completely private and not connected to the Internet. For example, some government networks are extensive and yet not connected to the Internet, and security devices can be used in those networks.

Figure 2:
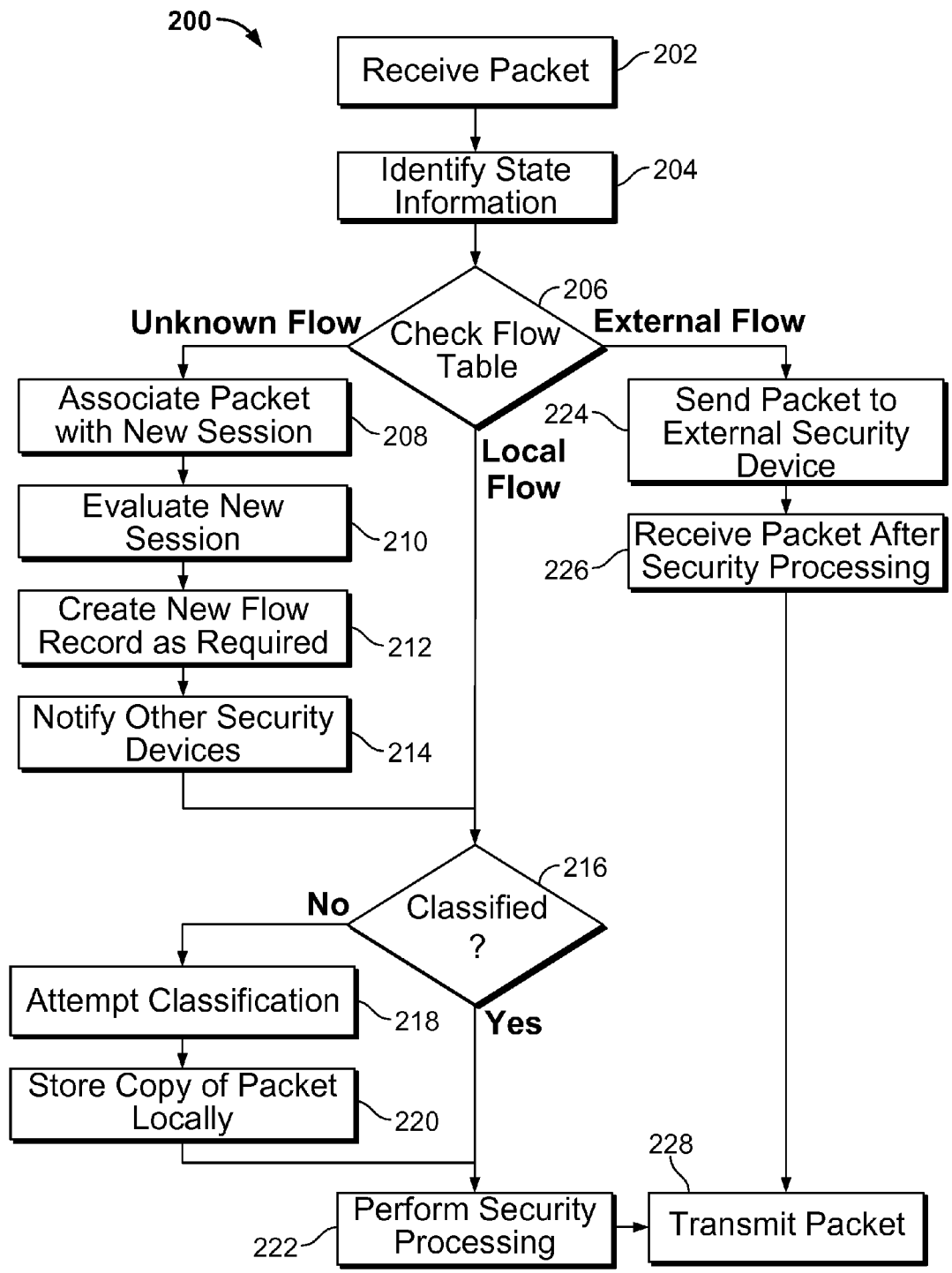
FIG. 2 is a diagram of an example technique for processing packets at a security device.

FIG. 2 is a diagram of an example technique 200 for processing packets at a security device. For purposes of illustration, the method will be described with respect to a security device (e.g., security device 102 or 104) that performs the technique.

A security device is a device that performs security processing of network traffic on a computer network. For example, a security device can be a firewall, an Intrusion Detection System (IDS), an Intrusion Prevention System (IPS), a device that includes combinations of functions from these devices, and so on. A firewall denies or permits network traffic based on a set of rules. A firewall can be used to secure a local area network from users outside the local area network. In some implementations, a firewall checks, routes, and labels messages sent to or from users outside a local area network. In some implementations, an IDS examines information being communicated within a network to recognize suspicious patterns of behavior. Information obtained by the IDS can be used to block unauthorized or disruptive users from accessing the network. An IPS is an in-line version of an IDS.

In some implementations, a security device is associated with or incorporated within a network device (e.g., a computer, peripheral or other related communications equipment attached to a network) to provide for a measure of security for the network or associated equipment. For example, routers and switches can be used to increase the security of the network as well as provide appropriate configuration steps for protecting the devices themselves against attacks.

Example security devices suitable for performing the technique 200 are described in U.S. patent application Ser. No. 11/475,393, entitled "Packet Classification in a Network Security Device." For example, that application shows a security device including a multi-mode classification engine. Other security devices are possible.

The security device receives a packet (step 202). In some implementations, the packet is a TCP/IP packet. In various implementations, the packet is a TCP segment, a User Datagram Protocol (UDP) datagram, a Real-time Transport Protocol (RTP) packet, an Asynchronous Transfer Mode (ATM) cell, or the like. In general, the packet is a block of data for transfer that is associated with layers below the application layer (i.e., layers below layer seven) of the Open Systems Interconnection (OSI) Model. The OSI model describes seven layers, and a layer describes a collection of functions and formats that provide services to the layer above it and receive services from the layer below it. Typically, the packet is associated with one of layers two, three, or four.

In some implementations, the security device receives a packet having been transmitted on a first route. A route is a path that information travels on between a source and a destination. In some implementations, a route includes one or more computing devices on a computer network. For example, on the Internet, a route can include several severs (e.g., designated by their IP addresses) that a packet passes through while traveling from a source to a destination. In some implementations, the route of a packet is determined by routers using a routing protocol, for example, the Border Gateway Protocol (BGP). Other protocols are possible. In other implementations, a route is a fixed path between a source and a destination.

In some implementations, the security device identifies state information associated with the packet. State information is information identifying or regarding a flow. A flow is a sequence of one or more packets communicating information between a source and a destination. A flow typically includes packets going in one direction (source to destination or the reverse) but in some implementations can include packets going in both directions. For example, in some implementations, a flow is a TCP connection or one side of a TCP connection (going only from a source to a destination). In other implementations, a flow is an ATM virtual circuit, a Stream Control Transmission Protocol (SCTP) stream, or the like. State information can include, for example, a 5-tuple of IP information including the IP source and destination addresses, TCP source and destination ports, and protocol type.

The security device determines whether the packet should be processed in one of three paths (step 206). In some implementations, the security device uses the state information to search for (or perform a look up or similar operation) a flow record in one or more flow tables (or databases or other data structures). A flow record can include the state information and other flow information, for example, security policy information (e.g., policy to apply to the flow, such as firewall policy, IPS policy, and so on), encryption parameters, address translation parameters, bookkeeping information, statistics, network policy information (i.e., relating to connection time outs, time billing, bandwidth usage), a reference to one or more applications associated with the flow, and so on.

In a first path, the security device determines that the packet is associated with an unknown flow. For example, in some implementations, the security device determines that there is no matching flow record in a flow table using state information associated with the packet. In some implementations, the security device associates the packet with a new session, e.g., a TCP session (step 208). The security device optionally evaluates the new session to determine if received packets associated with the new session should be allowed (step 210). For example, in some implementations, the security device performs security processing. In some implementations, the security device only performs limited security processing at this step, and later performs additional security processing.

If the security device determines that received packets associated with the new session should be allowed, the security device optionally creates a new flow record and store it in a flow table (step 212). The security device notifies one or more other security devices that the new flow (i.e., the flow associated with the packet and the new session) is assigned to the security device (step 214). For example, the security device can send a message to other security devices that includes the state information identified in step 204. In some implementations, if the security device decides to disallow all packets associated with a flow, the security device notifies one or more other security devices to disallow all packets associated with that flow. After notification, the first path joins a second path at step 216, described below.

In a second path, the security device determines that the packet is associated with a flow that is assigned to the security device, i.e., a local flow. For example, in some implementations, the security device finds a corresponding flow record in a flow table that indicates (e.g., in the flow information of the flow record) that the flow is assigned to the security device. In some implementations, the security device determines whether the flow has been classified (step 216). For example, the security device can use the flow record to determine that the security device previously classified the flow, e.g., classified the flow as belonging to an Instant Messenger (IM) TCP connection. If the flow has not been classified, the security device optionally attempts classification (step 218). For example, in some implementations, the security device attempts to classify the flow according to an application (e.g., an application running on a client computer) associated with the flow. In some implementations, the security device attempts classification using the header information of the packet, the body of the packet, or both. In various implementations, the security device attempts classification using techniques including, for example, deep packet inspection (DPI), TCP reassembly (e.g., storing packets sent out of order and putting them into order to inspect information sent using multiple packets), signature matching, heuristics, various combinations of techniques, and so on.

If the attempt to classify the flow is unsuccessful (or even if it is successful), the security device optionally stores a copy of the packet locally (step 220). Storing a copy of the packet can be useful, for example, for later classification or security processing that uses TCP reassembly. The security device performs security processing (step 222). For example, in some implementations, the security device determines whether to drop or allow the packet, log or store the packet, set an alarm, attempt to detect viruses and spyware, perform Uniform Resource Locator (URL) filtering and Data Leakage Prevention (DLP) (e.g., prevent sensitive information such as credit card information and social security numbers from leaving a trusted network), and so on. In some implementations, if the security device decides (e.g., based on security processing) to disallow all packets associated with a flow, the security device notifies one or more other security devices to disallow all packets associated with that flow. After security processing, the first and second paths join a third path at step 228, discussed below.

In a third path, the security device determines that the packet is associated with a flow that is assigned to an external security device, i.e., an external flow. For example, in some implementations, the security device finds a corresponding flow record in a flow table that indicates (e.g., in the flow information of the flow record) that the flow is assigned to the external security device. The flow record can also indicate a network address of the external security device. The security device sends the packet (or a version thereof) to the external security device (step 224). In some implementations, the security device communicates with the external security device using a direct (and optionally dedicated) physical connection (e.g., using an Ethernet connection, a wireless connection, an optical connection, or the like). In other implementations, the security device communicates with the external security device using a network, (e.g., the same network that is uses to send and receive packets).

The external security device performs security processing on the packet. In some implementations, the external security device attempts to classify the packet and its associated flow, and the external security device stores a copy of the packet locally. The security devices receives the packet from the external security device after security processing (step 226). In some implementations, the security device keeps a copy of the packet before sending it to the external security device, and the external security device sends a message indicating whether to drop the packet or transmit it (rather than sending the entire packet back). In other implementations, the external security device sends the packet back with modifications to it (for example, the packet may have been modified by the external security device to remove a virus from the flow). In some implementations, if the external security device decides to disallow all packets associated with a flow, the external security device notifies one or more other security devices to disallow all packets associated with that flow.

If after security processing (either done locally at the security device or externally at an external security device) the security device decides to allow the packet to pass, the security device transmits the packet (step 228). If the security device received the packet from another security device, it transmits the packet back to the other security device. In some implementations, where the received packet was transmitted on a first route, the security device transmits that packet so that it continues on the first route.

Figure 3:
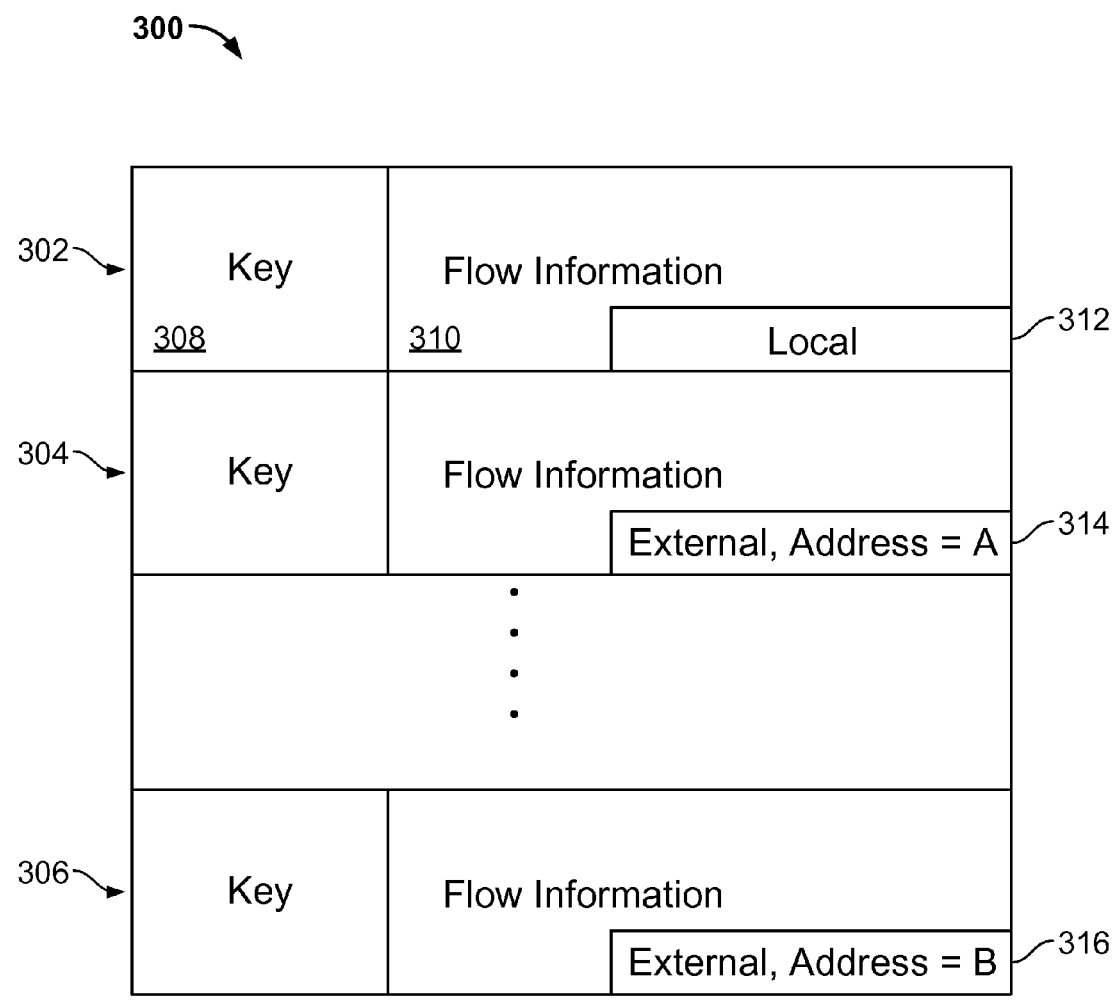
FIG. 3 illustrates a structure of an example flow table.

FIG. 3 illustrates a structure of an example flow table 300. The rows e.g. 302, 304, and 306 of the flow table 300 represent flow records associated with flows.

Referring to flow record 302, the flow record 302 includes an indexing key 308. A security device can use the indexing key 308 to store and retrieve the flow record 308 when it receives a packet associated with the flow. In some implementations, the indexing key 308 is a hash key (e.g., based on state information) and the flow table 300 is implemented as a hash table. The flow record 302 also includes flow information 310, e.g., flow information as described in connection with step 206 of method 200. The flow information 310 includes an indication 312 of whether the flow is assigned to the local security device or an external security device. For flow record 302, the flow is local, i.e., the flow is assigned to a local security device.

Referring to flow record 304, the flow record 304 also includes an indication 314 of whether the flow is external or local. For flow record 304, the flow is external, i.e., the flow is assigned to an external security device. In some implementations, the flow record also includes an address 314 (e.g., an IP address, a bus address, or the like) for the external security device. Flow record 306, also associated with an external flow, similarly includes an address 316. In some implementations, if the flow is assigned to an external security device, the flow table does not include any other flow information because it is stored in a different flow table at the external security device.

Figure 4:
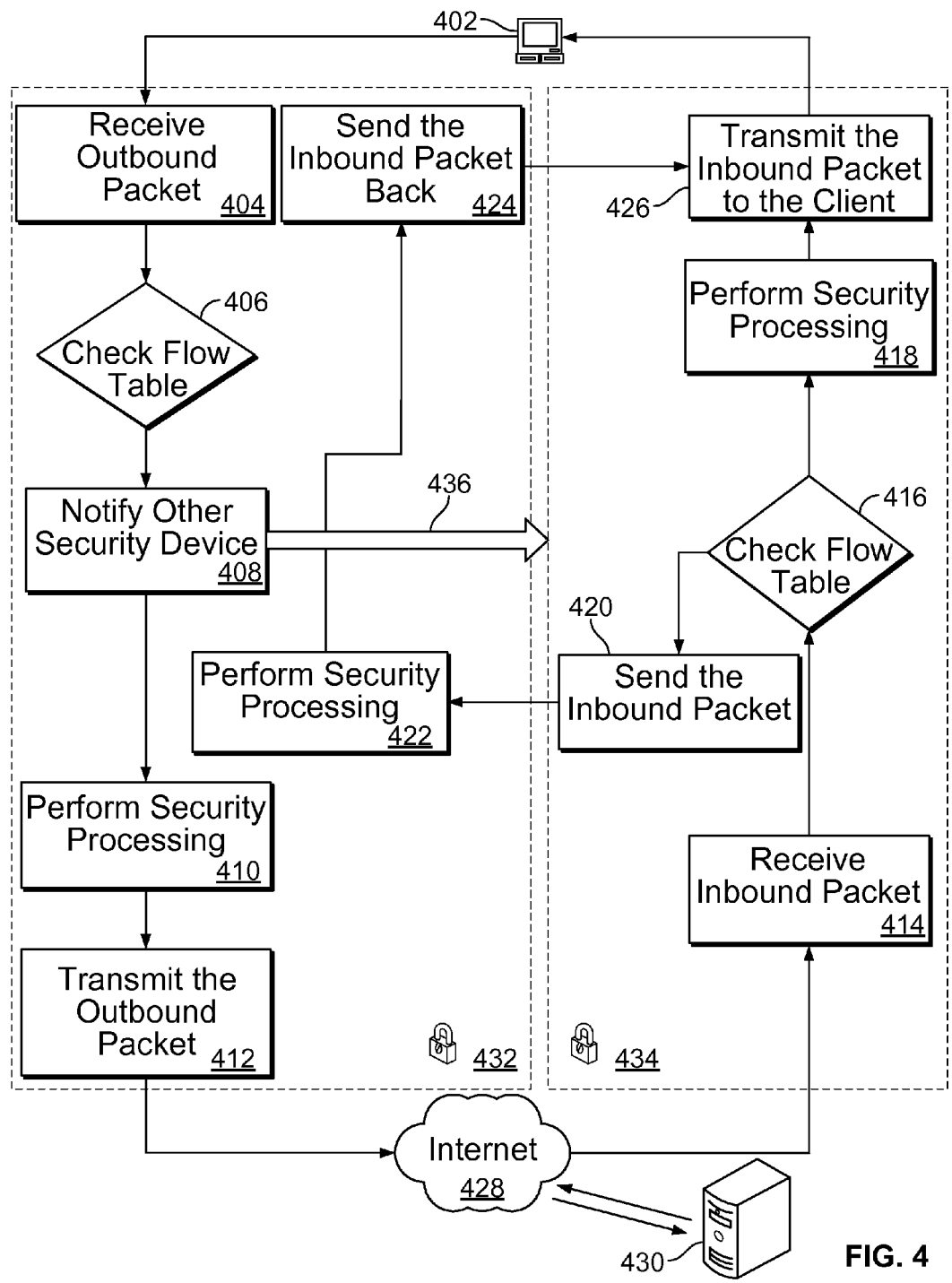
FIG. 4 is a diagram that illustrates an example path of an outbound packet from a client to a server and the path of an inbound reply packet.

FIG. 4 is a diagram that illustrates an example path of an outbound packet from a client 402 to a server 430 and the path of an inbound reply packet. The outbound packet can be a packet going from a computer network with a higher trust level (e.g., an internal network such as a corporate network) and going to a computer network with a lower trust levels (e.g., the Internet), and the inbound packet is going the opposite direction.

In this example, the client 402 is attempting to establish a new connection with the server 430. Further, in this example, the packets are routed asymmetrically on the Internet 428, so the outbound packet passes through a first security device 432 and the inbound reply packet passes through a second security device 434.

The first security device 432 receives the outbound packet (step 404). The first security device 432 checks its flow table to see if the outbound packet is associated with a known flow (step 406). Because the client is attempting to establish a new connection using the outbound packet, the first security device 432 determines that the outbound packet is associated with a new flow and adds a flow record to its flow table. The first security device 432 notifies the second security device 434 and sends state information 436 for the flow to the second security device 434 (step 408). The first security device performs security processing on the outbound packet (step 410). The first security device transmits the outbound packet (step 412). In this example, the packet goes to the Internet 428 and then to the server 430. The server 430 generates an inbound reply packet that goes to the Internet 428 and gets routed to the second security device 434.

The second security device receives the inbound packet (step 414). The second security device 434 checks its flow table and determines whether the inbound reply packet is associated with a known flow (step 416). In this example, the second security device 434 knows that the flow associated with the inbound reply packet is assigned to the first security device 432 because the first security device 432 sent state information 436 at step 408. If the flow associated with the inbound packet was assigned to the second security device 434, it would perform security processing (step 418); this step is shown for illustrative purposes although it is not taken in this example.

Because the flow associated with the inbound packet is assigned to the first security device 432, the second security device 434 sends the inbound packet to the first security device 432 (step 420). The first security device performs security processing (step 422). The first security device 432 sends the inbound packet back to the second security device 434 (step 424). The second security device 434 transmits the inbound packet to the client (step 426).

Figure 5:
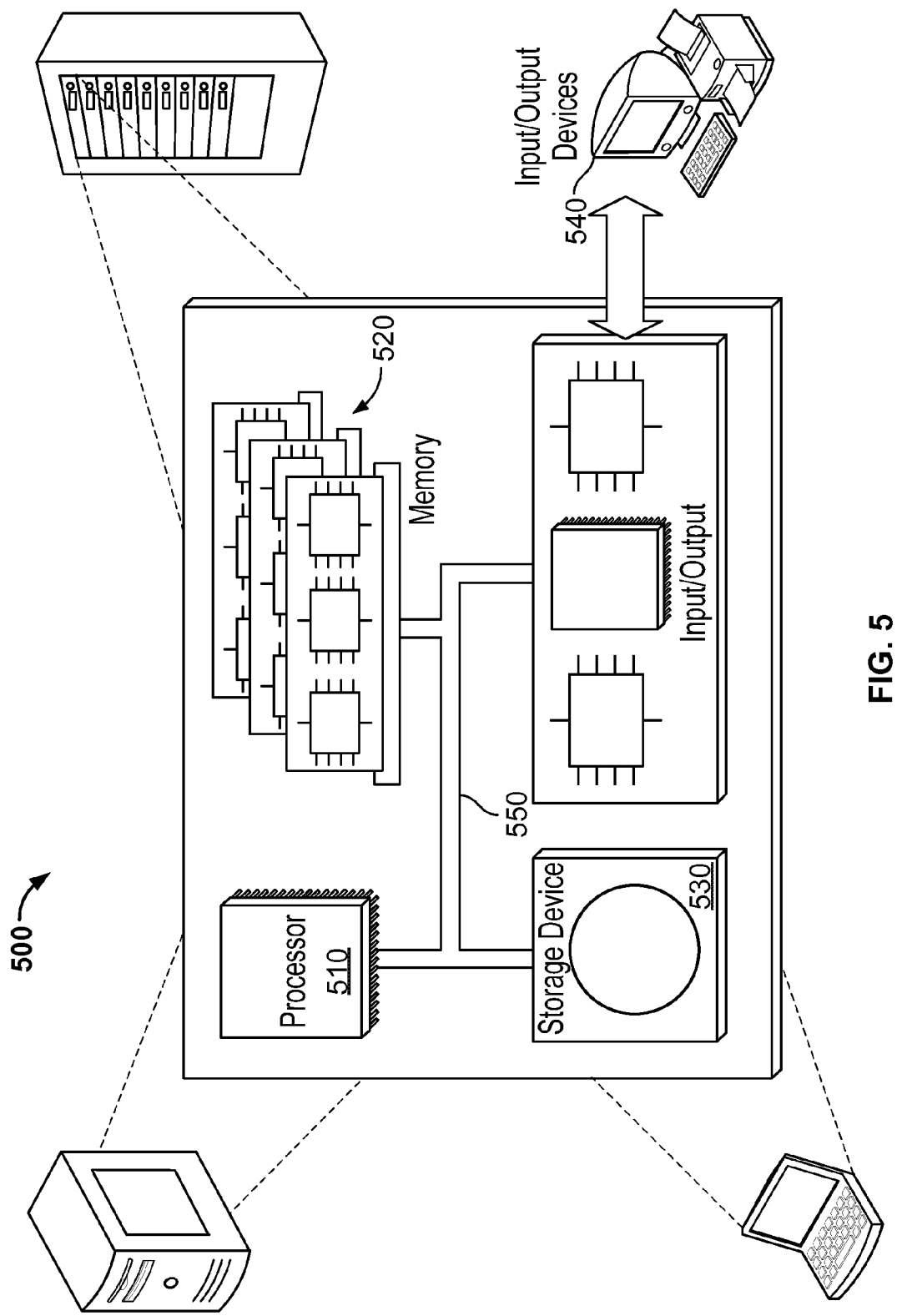
FIG. 5 is a schematic diagram of a generic computer system.

FIG. 5 is a schematic diagram of a generic computer system 500. The system 500 can be used for practicing operations described in association with the technique 200. The system 500 can include a processor 510, a memory 520, a storage device 530, and input/output devices 540. Each of the components 510, 520, 530, and 540 are interconnected using a system bus 550. The processor 510 is capable of processing instructions for execution within the system 500. Such executed instructions can implement one or more components of security device 102, for example. In some implementations, the processor 510 is a single-threaded processor. In other implementations, the processor 510 is a multi-threaded processor. The processor 510 is capable of processing instructions stored in the memory 520 or on the storage device 530 to display graphical information for a user interface on the input/output device 540.

The memory 520 is a computer readable medium such as volatile or non-volatile that stores information within the system 500. The memory 520 can store data structures representing flow tables, for example. The storage device 530 is capable of providing persistent storage for the system 500. The storage device 530 can be a floppy disk device, a hard disk device, an optical disk device, or a tape device, or other suitable persistent storage means. The input/output device 540 provides input/output operations for the system 500. In some implementations, the input/output device 540 includes a keyboard and/or pointing device. In various implementations, the input/output device 540 includes a display unit for displaying graphical user interfaces.

The input/output device 540 can provide input/output operations for a security device. For example, the input/output device 540 can include Ethernet ports or other networking ports to communicate with computer networks.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In some implementations, users can interact with a security device using a computer on a network. For example, a user on a personal computer can interact with a security device connected on the network using a web browser, a Secure Shell (SSH) client, a telnet client, or the like. In various implementations, a user can interact with a security device using a computer connected to the security device on a serial port, for example, a Recommended Standard 232 (RS-232) port.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

While this specification contains many implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A method for processing packets at a first security device, the method comprising:
   receiving a packet at the first security device;
   determining whether the packet is associated with a flow assigned to a second security device, wherein the second security device is distinct from the first security device;
   in the event that the packet is associated with the flow assigned to the second security device:
      sending the packet to the second security device; and
      after the second security device performs security processing using the packet, receiving from the second security device a message regarding the packet;
   in the event that the packet is not associated with the flow assigned to the second security device:
      determining whether the packet is associated with a previously assigned flow;
      in the event that the packet is not associated with the previously assigned flow:
         storing a new flow relating to the packet in the first security device; and
         notifying the second security device that the new flow is stored in the first security device; and
      performing, using the first security device, security processing using the packet; and
   transmitting the packet from the first security device.

2. The method of claim 1, wherein the message comprises the packet.

3. The method of claim 1, wherein the packet is one of the following: an Internet Protocol (IP) packet, a Transmission Control Protocol (TCP) segment, and a User Datagram Protocol (UDP) datagram.

4. The method of claim 1, wherein:
   the first security device and the second security device are each a combination of one or more of the following: a firewall, a router, a switch, an Intrusion Detection System (IDS), and an Intrusion Protection System (IPS); and
   security processing includes one or more of the following: determining whether to drop or allow the packet, logging or storing the packet, setting an alarm, detecting viruses, detecting spyware, Uniform Resource Locator (URL) filtering, and Data Leakage Prevention (DLP).

5. The method of claim 1, wherein:
receiving the packet at the first security device comprises receiving the packet having been transmitted on a first route; and
transmitting the packet from the first security device comprises transmitting the packet so that it continues along the first route.

6. The method of claim 1, wherein:
the packet is a response to an outbound packet associated with the flow;
the second security device performed security processing on the outbound packet; and
the second security device notified the first security device that the flow was assigned to the second security device.

7. The method of claim 1, wherein:
the packet is a response to an outbound packet associated with the flow;
the outbound packet was sent from a client to a server through the second security device;
the second security device performed security processing on the outbound packet;
the second security device notified the first security device that the flow was assigned to the second security device; and
the packet was sent from the server to the first security device, wherein the packet is destined for the client.

8. The method of claim 1, wherein determining that the packet is associated with a flow assigned to the second security device includes:
identifying state information associated with the packet; and
determining whether the state information associated with the packet is included in a flow table.

9. The method of claim 1, further comprising:
receiving an additional packet at the first security device;
determining whether the additional packet is not associated with a flow;
associating the additional packet with a new session;
evaluating the new session to determine if received packets associated with the new session should be allowed;
if received packets associated with the new session should be allowed, creating a new flow record in a flow table; and
notifying the second security device that a new flow associated with the additional packet is assigned to the first security device.

10. A computer program product, encoded on a non-transitory computer-readable medium, comprising computer instructions that when executed cause a first security device to perform operations comprising:
receiving a packet at the first security device;
determining whether the packet is associated with a flow assigned to a second security device, wherein the second security device is distinct from the first security device;
in the event that the packet is associated with the flow assigned to the second security device:
sending the packet to the second security device; and
after the second security device performs security processing using the packet, receiving from the second security device a message regarding the packet;
in the event that the packet is not associated with the flow assigned to the distinct second security device:
determining whether the packet is associated with a previously assigned flow;
in the event that the packet is not associated with the previously assigned flow:
storing a new flow relating to the packet in the first security device; and
notifying the second security device that the new flow is stored in the first security device; and
performing, using the first security device, security processing using the packet; and
transmitting the packet from the first security device.

11. The computer program product recited in claim 10, wherein the message comprises the packet.

12. The computer program product recited in claim 10, wherein the packet is one of the following: an Internet Protocol (IP) packet, a Transmission Control Protocol (TCP) segment, and a User Datagram Protocol (UDP) datagram.

13. The computer program product recited in claim 10, wherein:
the first security device and the second security device are each a combination of one or more of the following: a firewall, a router, a switch, an Intrusion Detection System (IDS), and an Intrusion Protection System (IPS); and
security processing includes one or more of the following: determining whether to drop or allow the packet, logging or storing the packet, setting an alarm, detecting viruses, detecting spyware, Uniform Resource Locator (URL) filtering, and Data Leakage Prevention (DLP).

14. The computer program product recited in claim 10, wherein:
receiving the packet at the first security device comprises receiving the packet having been transmitted on a first route; and
transmitting the packet from the first security device comprises transmitting the packet so that it continues along the first route.

15. The computer program product recited in claim 10, wherein:
the packet is a response to an outbound packet associated with the flow;
the second security device performed security processing on the outbound packet; and
the second security device notified the first security device that the flow was assigned to the second security device.

16. The computer program product recited in claim 10, wherein:
the packet is a response to an outbound packet associated with the flow;
the outbound packet was sent from a client to a server through the second security device;
the second security device performed security processing on the outbound packet;
the second security device notified the first security device that the flow was assigned to the second security device; and
the packet was sent from the server to the first security device, wherein the packet is destined for the client.

17. The computer program product recited in claim 10, where determining that the packet is associated with a flow assigned to the second security device includes:
identifying state information associated with the packet; and
determining whether the state information associated with the packet is included in a flow table.

18. The computer program product recited in claim 10, the operations further comprising:
receiving an additional packet;

determining that the additional packet is not associated with a flow;
associating the additional packet with a new session;
evaluating the new session to determine if received packets associated with the new session should be allowed;
if received packets associated with the new session should be allowed, creating a new flow record in a flow table; and
notifying the second security device that a new flow associated with the additional packet is assigned to the first security device.

19. A system comprising:
a first security device comprising one or more processors and one or more network interfaces;
wherein the first security device has encoded on a computer-readable medium instructions operable to cause one or more of the processors of the first security device to perform operations comprising:
receiving a packet at the first security device using one of the network interfaces;
determining whether the packet is associated with a flow assigned to a second security device, wherein the second security device is distinct from the first security device;
in the event that the packet is associated with the flow assigned to the second security device:
sending the packet to the second security device; and
after the second security device performs security processing using the packet, receiving from the second security device a message regarding the packet;
in the event that the packet is not associated with the flow assigned to the second security device:
determining whether the packet is associated with a previously assigned flow;
in the event that the packet is not associated with the previously assigned flow:
storing a new flow relating to the packet in the first security device; and
notifying the second security device that the new flow is stored in the first security device; and
performing, using the first security device, security processing using the packet; and
transmitting the packet from the first security device using one of the network interfaces.

20. The system recited in claim 19, wherein the message comprises the packet.

21. The system recited in claim 19, wherein the packet is one of the following: an Internet Protocol (IP) packet, a Transmission Control Protocol (TCP) segment, and a User Datagram Protocol (UDP) datagram.

22. The system recited in claim 19, wherein:
the first security device and the second security device are each a combination of one or more of the following: a firewall, a router, a switch, an Intrusion Detection System (IDS), and an Intrusion Protection System (IPS); and
security processing includes one or more of the following: determining whether to drop or allow the packet, logging or storing the packet, setting an alarm, detecting viruses, detecting spyware, Uniform Resource Locator (URL) filtering, and Data Leakage Prevention (DLP).

23. The system recited in claim 19, wherein:
receiving the packet at the first security device comprises receiving the packet having been transmitted on a first route; and
transmitting the packet from the first security device comprises transmitting the packet so that it continues along the first route.

24. The system recited in claim 19, wherein:
the packet is a response to an outbound packet associated with the flow;
the second security device performed security processing on the outbound packet; and
the second security device notified the first security device that the flow was assigned to the second security device.

25. The system recited in claim 19, wherein:
the packet is a response to an outbound packet associated with the flow;
the outbound packet was sent from a client to a server through the second security device;
the second security device performed security processing on the outbound packet;
the second security device notified the first security device that the flow was assigned to the second security device; and
the packet was sent from the server to the first security device, wherein the packet is destined for the client.

26. The system recited in claim 19, where determining that the packet is associated with a flow assigned to the second security device includes:
identifying state information associated with the packet; and
determining whether the state information associated with the packet is included in a flow table.

27. The system recited in claim 19, the operations further comprising:
receiving an additional packet;
determining that the additional packet is not associated with a flow;
associating the additional packet with a new session;
evaluating the new session to determine if received packets associated with the new session should be allowed;
if received packets associated with the new session should be allowed, creating a new flow record in a flow table; and
notifying the second security device that a new flow associated with the additional packet is assigned to the first security device.

28. The system recited in claim 19, further comprising the second security device.

* * * * *